United States Patent [19]

Murakami et al.

[11] Patent Number: 4,736,241
[45] Date of Patent: Apr. 5, 1988

[54] WHITE BALANCE ADJUSTING DEVICE OF COLOR VIDEO CAMERA

[75] Inventors: Toshio Murakami; Yasushi Takagi, both of Yokohama; Hiroyasu Ohtsubo; Yutaka Satoh, both of Katsuta, all of Japan

[73] Assignee: Hitachi, Ltd., Tokyo, Japan

[21] Appl. No.: 937,394

[22] Filed: Dec. 3, 1986

[30] Foreign Application Priority Data

Dec. 4, 1985 [JP] Japan ................. 60-271423
Dec. 20, 1985 [JP] Japan ................. 60-285523
Jun. 9, 1986 [JP] Japan ................. 61-131856

[51] Int. Cl.$^4$ ............................................. H04N 9/73
[52] U.S. Cl. ........................................................ 358/29
[58] Field of Search ..................................... 358/29 C

[56] References Cited

U.S. PATENT DOCUMENTS 4,486,771 12/1984 Machida et al. ................. 358/29 C
4,506,290 3/1985 Hashimoto ....................... 358/29 C
4,590,512 5/1986 Kondo ............................. 358/29 C

FOREIGN PATENT DOCUMENTS

44388 3/1982 Japan ............................... 358/29 C
142693 8/1983 Japan ............................... 358/29 C Primary Examiner—John W. Shepperd
Attorney, Agent, or Firm—Antonelli, Terry & Wands

[57] ABSTRACT

A white balance adjusting device detects a change of color temperature for an illuminating light source from chrominance signals supplied from an image pickup device of a color video camera and controls gains of circuits of a chrominance signal processing circuit for processing red (R) signal and blue (B) signal in accordance with the detected signal to automatically adjust the white balance. The device has a circuit for generating a color temperature change detection signal from at least two different chrominance signals, a comparator/amplifier for amplifying a difference between the detection signal and a reference voltage, a tracking correction circuit to which the output of the comparator/amplifier is supplied and which produces two control signals, and gain control circuits for controlling gains for the red (R) signal and blue (B) signal in accordance with the two control signals. The color temperature change detection circuit, comparator/amplifier, tracking correction circuit and gain control circuits constitute a negative feedback loop.

20 Claims, 9 Drawing Sheets

WHITE BALANCE ADJUSTING DEVICE OF COLOR VIDEO CAMERA

BACKGROUND OF THE INVENTION

The present invention relates to a white balance adjusting device suitable for a color video camera, and more particularly to a device which automatically adjusts a white balance in accordance with a change of a color temperature.

An internal signal measurement type automatic tracking auto-white balancing device which processes a signal from an image pickup device by a signal processing circuit to detect a change in a color temperature for an illuminating light source based on the processed signal and controls gains of red (R) signal and blue (B) signal circuits of a chrominance signal system of a camera in accordance with the detected signal to automatically adjust the white balance, has been known. Examples of such devices are disclosed in JP-A-No. 58-142693, JP-A-No. 59-189793 and U.S. Pat. No. 3,786,177. A principle of the white balance device of this type is based on the fact that a screen average of differential chrominance signals R-G (or R-$Y_L$, where $Y_L$ is a low frequency component of a brilliance signal), B-G (or B-$Y_L$) signals or R-B signals produced by imaging a general object is in almost all cases an approximation to a value derived from a non-colored area of the general object. Based on this presumption, the screen average of the differential chrominance signals is zero if the white balance matches and the average signal changes in accordance with the change of the color temperature as the illumination to the object changes. Thus, the change is detected to control the gains of the R and B signal gain control circuits so that the white balance is adjusted. In JP-A-No. 58-142693, the R-G and B-G signals are produced from three principal color signals and they are filtered and negatively fed back in the R and B gain control circuits so that the chrominance signals are rendered zero in order to attain the white balance adjustment. In JP-A-No. 59-189793 and U.S. Pat. No. 3,786,177, in addition to the presumption of equivalence to white, an experimental fact that it is rare that a general object which does not include a white area is imaged is also taken into consideration. Thus, the white area is extracted from the object and the differential chrominance signal such as R-B signal of the white area is detected. When the average signal of differential chrominance signal is used, a probability of determination of equivalence to non-color increases and more correct control voltage can be produced for the change of illumination of the object, that is, the change of color temperature.

However, for an object which does not satisfy the above presumption, for example, single green color (monocolor) object such as wide green, field or a number of plants, it is impossible to determine that the average signal is equivalent to non-color. As a result, under such an imaging condition, the prior art device may produce an incorrect white balance control signal or cannot detect white and the white balance control does not operate and color reproducibility is degraded. The degradation of the color reproducibility increases as an area of monocolor on a monitor screen increases. The prior art device needs two separate negative feedback control circuits for the R-signal channel and B-signal channel, or it needs memories for storing R, G and B signals one for each of typical imaging light sources such as tungsten light and solar light, or it needs level comparators for R-G and B signals for detecting a white area and a memory for storing previous white balance control information until new control is started after the detection of the white area. As a result, a circuit scale is large and versatile. Where the white balance is adjusted by feed-forward control, it becomes difficult in such a design to have tracking accuracy and circuit stability, such as, between a control signal and a controlled amount.

SUMMARY OF THE INVENTION

It is an object of the present invention to provide an automatic white balance adjusting device which includes a small white balance adjusting error, for stably reproducing color using a simple circuit configuration.

In order to achieve the above object, the automatic white balance adjusting device comprises means for generating (R-B) signals or log R/B signals from a camera signal produced by an image pickup device and averaging them to detect a signal which changes with a color temperature, amplifier means for generating a white balance control signal in accordance with the detection signal and non-linearly amplifying a change from a reference color temperature, tracking correction means for dividing the control voltage at a proportion to trace-control loci of changes of R and B signals due to a change of color temperature of a light source to produce two control signals, and negative feedback loops for controlling R and B gain control circuits by the two divided control signals.

Figure 2:
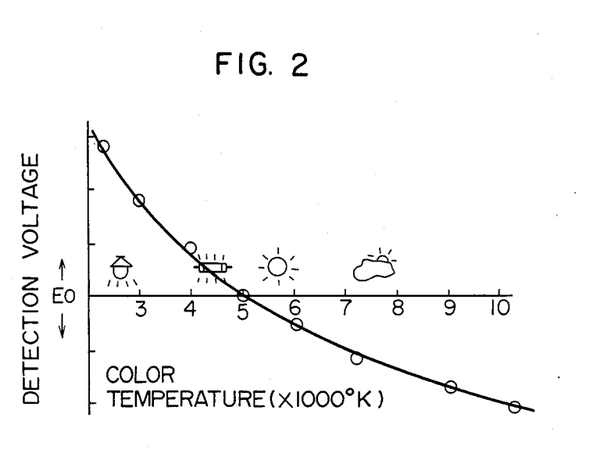
FIG. 2 shows a characteristic of a detection voltage of a white balance control voltage versus a change of color temperature.
Figure 3:
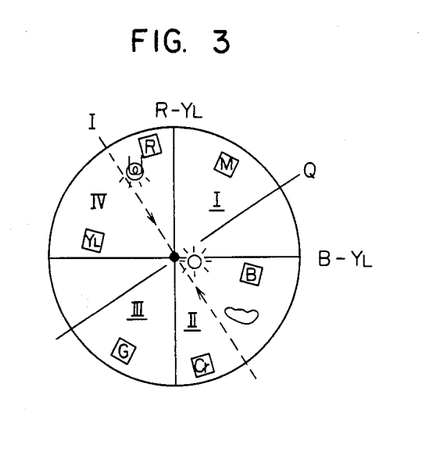
FIG. 3 shows an arrangement of chrominance signals on a vectorscope monitor.

The first means described above filters (averages) the (R-B) signal or log R/B signal. The average signal is zero if the white balance is attained, and the average signal changes with the change of the color temperature. For example, when a white object is imaged while the color temperature of the light source is changed from a low color temperature to a high color temperature corresponding to incandescent lamp, fluorescent lamp, solar light and cloudy light, the filtered (R-B) signal monotonously changes as shown in FIG. 2, in which 5000° K is a reference white balance adjusting color temperature. A filtered log R/B signal also changes in a similar tendency, although it is not shown. This characteristic is exhibited when a white object is imaged. If the average signal of (R-B) signals or log R/B signals is considered to be equivalent to a value derived from a non-colored area of a general object, a signal having a similar tendency to FIG. 2 is detected even from a colored image. This means that the average signal of the (R-B) signals or log R/B signals may be used as a white balance adjustment control voltage. By detecting the color temperature change by processing the R and B signal which do not include the G signal or $Y_L$ signal, a vector monitor which represents color arrangement shown in FIG. 3 is essentially insensitive to colors on quadrants I and III which represent green and magenta. For example, even if all field of object is green, the green is R≈B≈O if the detection signal includes no G component and the white balance is attained. Accordingly, the detection signal is R-B≈O or log R/B≈O and it is insensitive to green. On the other hand, for magenta, R≈B. Accordingly, the detection signal is R-B≈O or log R/B≈O, and it is insensitive. In the vector monitor shown in FIG. 3, the detection signal is insensitive or acceptably small for colors shown in the quadrants I and III. Accordingly, when a colored object is photographed, the degradation of color reproducibility can be significantly prevented. In FIG. 3, an origin point is a white point for a white balance adjustment reference color temperature. The white point varies on an axis I shown by a broken line as the color temperature of the light source changes. The second means, that is, the tracking correction circuit which controls the gains of the R and B gain control circuits in a sea-saw manner for one input control signal to produce two control signals which trace-control only on the axis of change of the light source in order to attain a so-called uniaxis control system. On the other hand, in a biaxis control system in which two differential chrominance signals R-G (or R-$Y_L$) and B-G (or B-$Y_L$) are detected to control the R and B gains, respectively, so that the white balance is controlled to render the differential chrominance signals zero independently, the differential chrominance signals are independently controlled. Accordingly, if an error signal is produced, tonality is unnatural. However, in the uniaxis control system, even if an error signal which is not regarded as white is produced by photographing a colored object, the tonality is not abnormal because it is trace-controlled on the change of color temperature of the light source and no feeling of significant mismatching is produced from a reproduced image.

Figure 4:
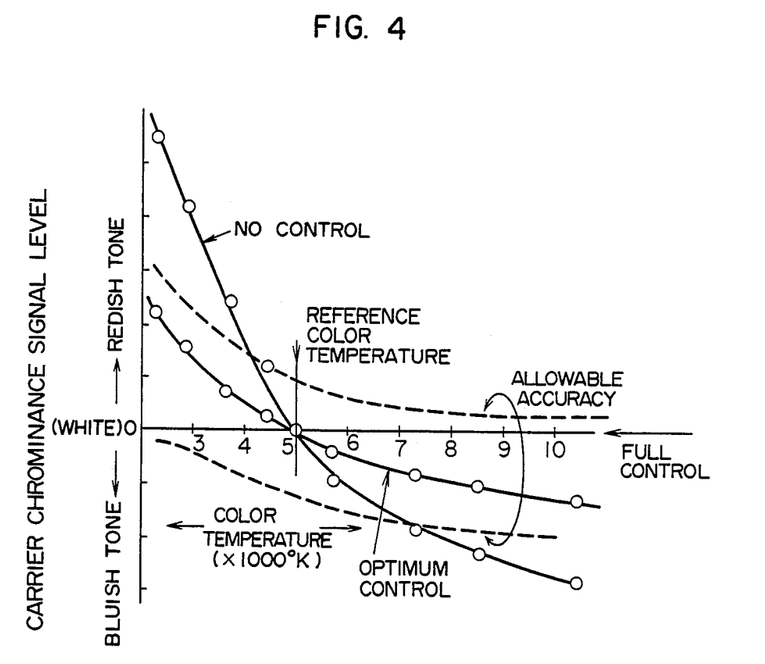
FIG. 4 shows a characteristic illustrating a trend of control of the white balance adjustment.

The third means, that is, the amplifier for non-linearly amplifying the average signal, corresponding to the change in color temperature from the reference color temperature, is explained. FIG. 4 shows a change of the white balance for a change of the color temperature, when a white object is photographed, by a level of a carrier chrominance signal which is derived by balance-modulating the differential chrominance signals R-$Y_L$ and B-$Y_L$ having a phase difference of 90°, by a sub-carrier and then combining them. It corresponds to a deviation (change of distance) from the origin point (white balance condition) in FIG. 3.

As seen from the non-controlled characteristic of FIG. 4, when the white balance control is not attained, the carrier chrominance signal is generated which causes the entire screen redish at the low color temperature and bluish at the high color temperature. A broken line shows a range of allowance of white unbalance in the reproduced image. That is, when there occur the discrepancies of bluish color tone at the low color temperature and redish color tone at the high color temperature, any little white balance discrepancy cannot be allowed. Now, in the case that any information from a broadcasting station, such as a television broadcasting station, is given one-sidedly, and any light source under photographing conditions is unclear to the persons who look at the television pictures, it is considered proper to ideally adjust the white balance as shown in the perfect control characteristic in FIG. 4 under all light sources such as incandescent lamp, sun light and cloudy weather. However, human eyes do not perfectly adopt to attain the white balance for various color temperatures, but under a low color temperature light source such as a halogen lamp or an incandescent lamp, a white object is actually observed slightly redish to impart a warm tonality as a whole. Accordingly, under a circumstance where an object is photographed by a home video camera or an 8 mm video movie, it is preferable to properly set a control amount within an allowable accuracy range as shown in the optimum control characteristic of FIG. 4 rather than to attain white balance theoretically under any light source. Namely, optimization is done such that a warm feeling (redish) is imparted at the low color temperature and a cool feeling (bluish) is imparted at the high color temperature. This means that, in the negative feedback control loop of the present invention, a feedback control characteristic which results in a proper residual error by a low loop gain characteristic is used rather than detecting an error signal, increasing a loop gain and controlling to the reference white. The third means changes with the change of the color temperature. It may be attained by an amplifier having a non-linear and low gain characteristic to the change of the average signal shown in FIG. 2, from the reference adjustment point.

The above optimum control characteristic also effectively limits the control amount for the error signal generated when the detection signal for the mono-color object is not equivalent to that for a white object. Accordingly, a white balance error generated when the color object is photographed is reduced.

The fourth means forms the feedback loop by the first, second and third means. Thus, a stable automatic tracking white balance is attained.

DESCRIPTION OF THE PREFERRED EMBODIMENTS

One embodiment of the present invention is explained with reference to FIG. 1. An image signal photo-electrically converted by an image pickup device 1 is supplied to a signal processing circuit 2 where camera signals such as a billiance signal Y, a low frequency component $Y_L$ of the brilliance signal Y (for example, a bandlower than 500 kHz), a red signal component R and a blue signal component B are generated. The generated R signal, B signal and low frequency component $Y_L$ of the brilliance signal are supplied to a processing circuit 5 through a variable gain control amplifier 3, a variable gain control amplifier 4 and directly, respectively. The processing circuit 5 processes those input signals to generate differential chrominance signals $R\gamma$- $Y_L\gamma$ and $B\gamma$- $Y_L\gamma$, which are supplied to an encoder 6 together with the brilliance signal Y generated by the signal processing circuit 2. The encoder 6 balance-modulates the differential chrominance signals $R\gamma$- $Y_L\gamma$ and $B\gamma$- $Y_L\gamma$ by sub-carriers having a phase difference of 90° therebetween and combines the modulated signals to generate a carrier chrominance signal, which is then mixed with the brilliance signal. A synchronization signal, a blanking signal and a burst signal are added thereto to produce a composite video-signal or a television signal.

Figure 1:
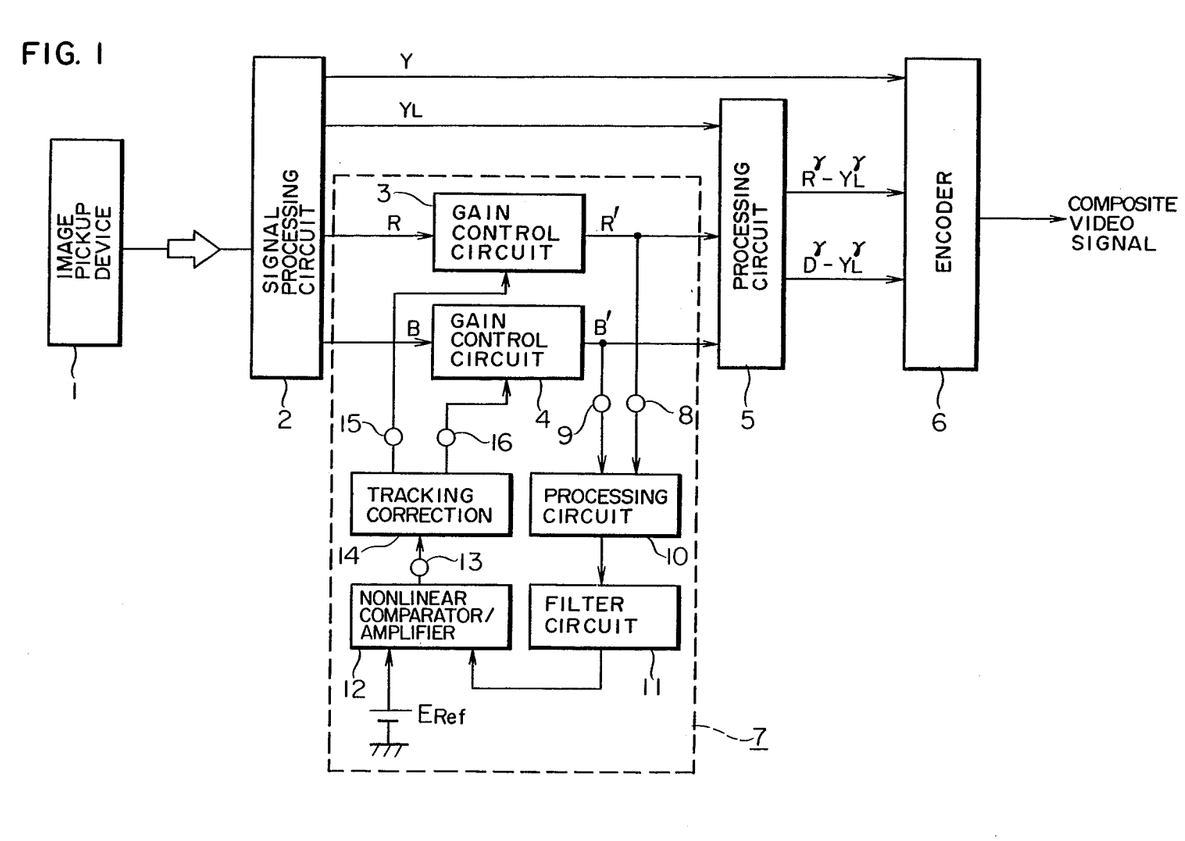
FIG. 1 shows a block diagram of one embodiment of a white balance adjusting device of the present invention.

In FIG. 1, a block 7 is an automatic tracking white balance circuit of the present invention. The gain control circuits 3 and 4, a processing circuit 10, a filter circuit 11, a reference voltage source Eref, a comparator/amplifier 12 and a tracking correction circuit 14 constitute a negative feedback loop. The operation is now explained. The R signal and B signal supplied to the gain control circuits 3 and 4 vary with the color temperature of the light source. For example, as the color temperature falls, the R signal increases and the B signal decreases. Those signals are controlled to signals R' and B' of desired levels by the gain control circuits 3 and 4 so that the white balance is adjusted. The R' signal and B' signal produced at terminals 8 and 9 are supplied to the processing circuit 10 where a (R'- B') signal is produced. It is filtered and averaged by the filter circuit 11. The averaged signal varies with the color temperature as shown by the characteristic shown in FIG. 2. The detection signal is relatively insensitive to the chrominance signals represented by the quadrants I and III, as shown in FIG. 3. The detected color temperature signal is supplied to the comparator/amplifier 12 where it is compared with the reference voltage Eref for adjusting the reference white balance, and a difference from the reference color temperature is amplified. The comparator/ amplifier 12 has an amplification characteristic which is non-linear to said difference and of relatively low gain so that the optimum characteristic shown in FIG. 4 is attained. The control signal amplified by the comparator/amplifier 12 is applied to an input terminal 13 of the tracking correction circuit 14 which produces two gain control signals at terminals 15 and 16 to tracecontrol only on a locus of the light source on the vectorscope of FIG. 3 in order to control the R gain and B gain.

Figure 5:
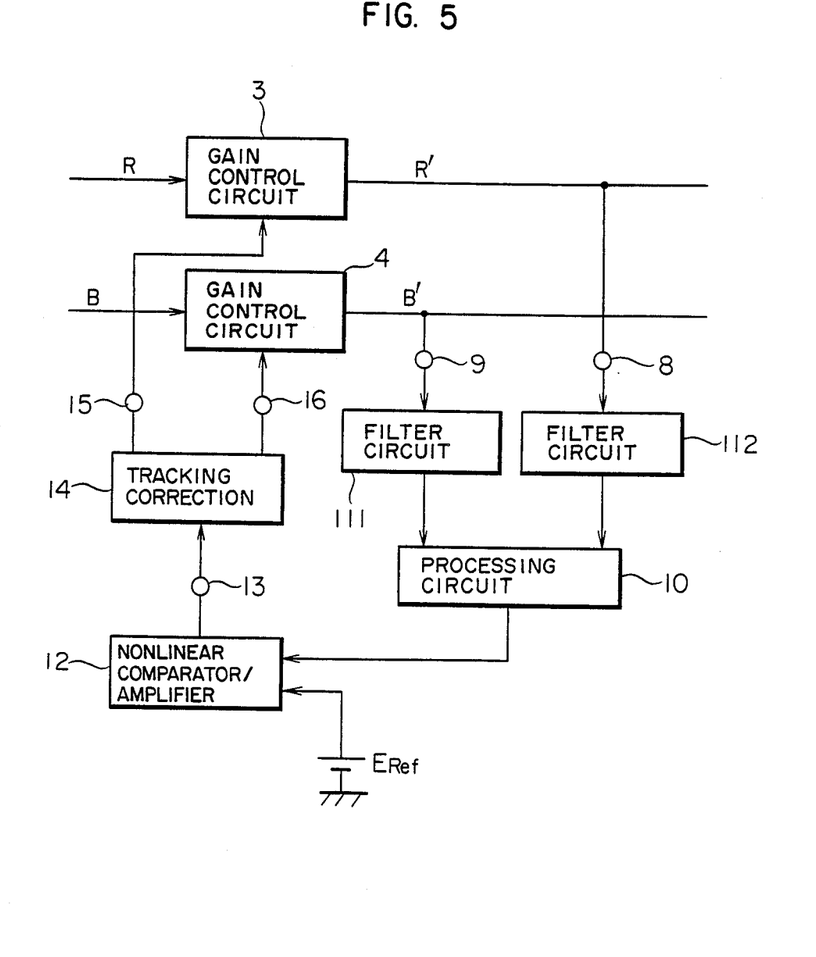
FIGS. 5 to 8 show block diagrams of major portions of modifications of the embodiment of FIG. 1.

The advantages of the respective means have been described in the section SUMMARY OF INVENTION. By the circuit configuration of the present invention, the disadvantage inherent to the prior art device, that is, the degradation of the color reproducibility in photographing the colored object is significantly prevented. As a result, the present invention facilitates attaining acceptable color reproducibility for any object with the optimum control characteristic. Thus, a stable, simple and low cost automatic tracking auto-white balance device is provided. In the embodiment shown in FIG. 1, the R' signal and B' signal are processed by the processing circuit 10 to generate the signal R'-B', which is then filtered by the filter circuit 11. Alternatively, as shown in FIG. 5, the R' signal and B' signal may be filtered and averaged by filter circuits 111 and 112, respectively, and the averaged signals may be processed by the processing circuit 10 to generate the control signal R'- B'.

Figure 6:
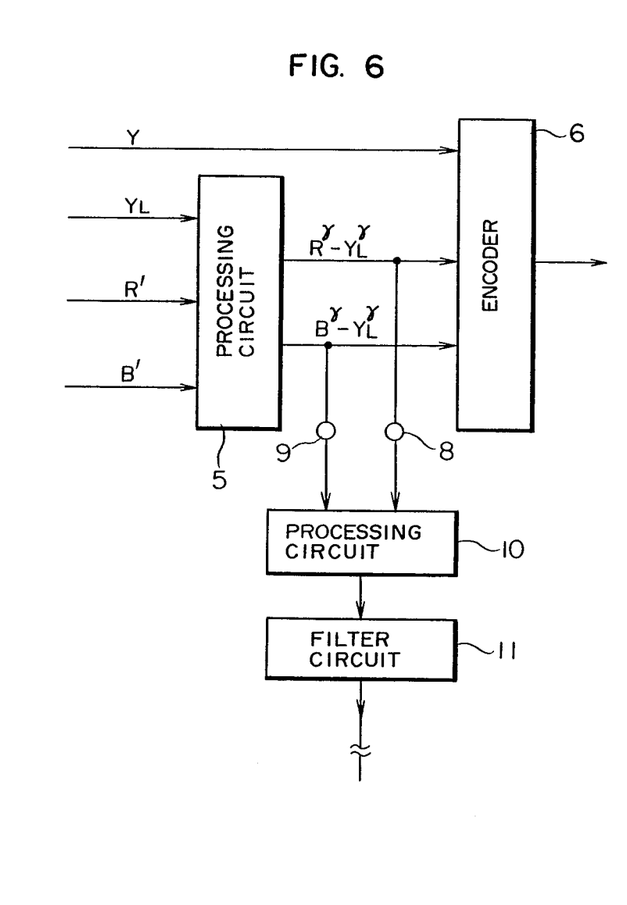

FIG. 6 shows an embodiment for detecting a control signal due to the change of color temperature, from two differential chrominance signals $R\gamma-Y_L\gamma$ and $B\gamma-Y_L\gamma$. The differential chrominance signals $R\gamma-Y_L\gamma$ and $B\gamma-Y_L\gamma$ are processed by the processing circuit 10 to produce $R\gamma-B\gamma$, that is, $(R\gamma-Y_L\gamma)-(B\gamma-Y_L\gamma)=R\gamma-B\gamma$. It is easy in the signal processing system to extract the differential chrominance signals in the camera circuit, and the processing circuit 5 usually carries out $\gamma$-correction. The lower the signal level is, the more it is amplified so that the control signal is effectively generated.

Figure 7:
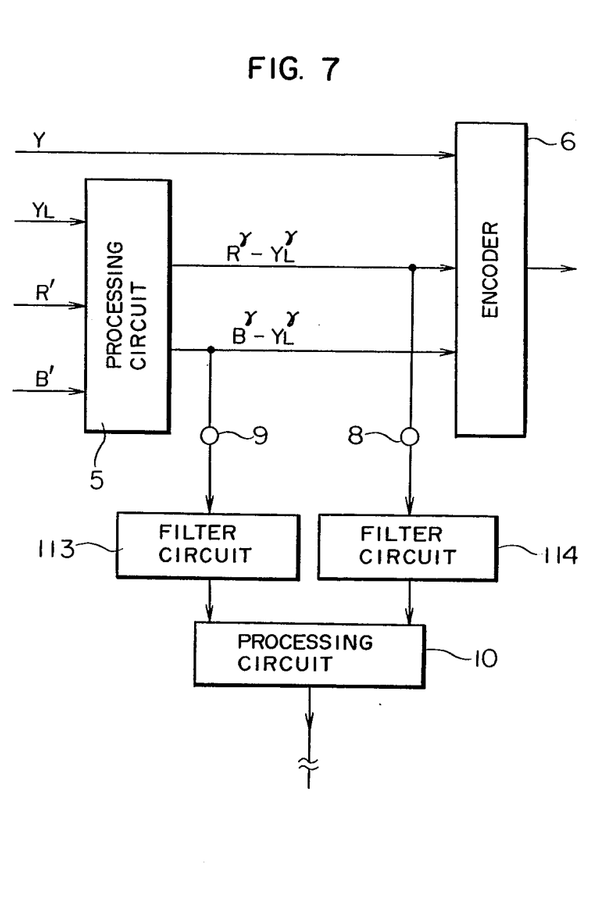

In an embodiment of FIG. 7, the differential chrominance signals $R\gamma-Y_L\gamma$ and $B\gamma-Y_L\gamma$ are filtered and averaged by filter circuits 113 and 114, respectively, and the averaged signals are processed by the processing circuit 10 which produces a control signal $R\gamma-B\gamma$. The same effect as that of FIG. 6 is attained.

The means for generating the signal R - B which varies with the change of color temperature have been shown and described by the embodiments of FIGS. 1, 5, 6 and 7. The processing circuit 10 in the embodiment of FIG. 1 may be replaced by a processing circuit 10' shown in FIG. 8, which comprises logarithm circuits 17r and 17b and a processing circuit 18.

Figure 8:
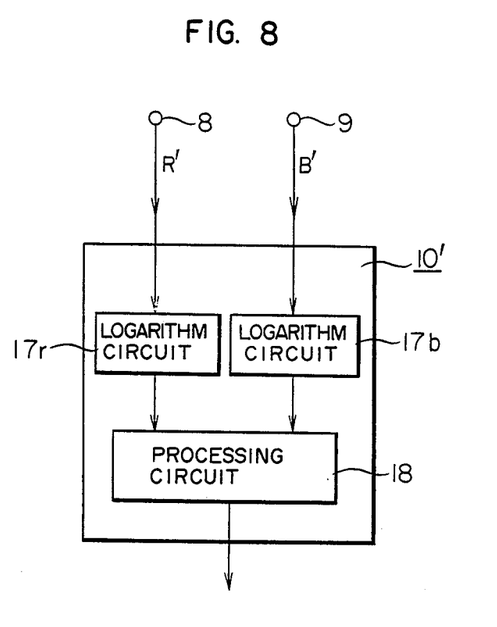
Figure 11:
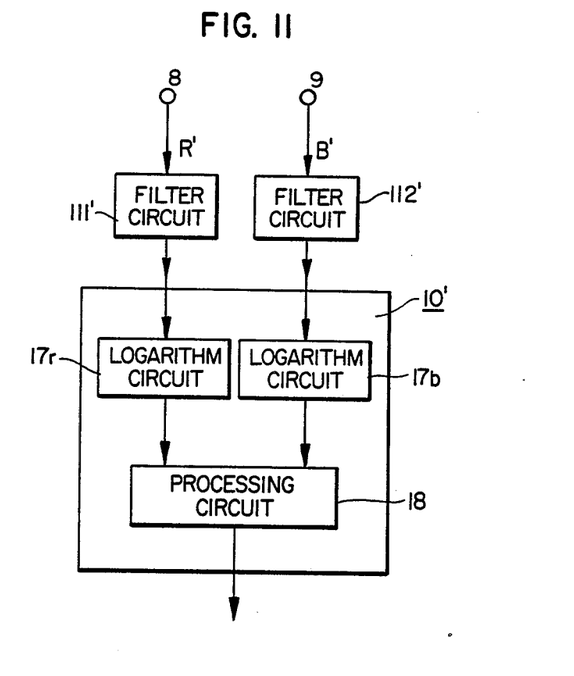
FIG. 11 shows a block diagram of a further modification of the embodiment of FIG. 1.

FIG. 11 illustrates another variation of FIG. 1 implementing the embodiments of both FIGS. 5 and 8. The R' signal and B' signal produced at the terminals 8 and 9 are supplied to the logarithm circuits 17r and 17b, which supply their outputs to the processing circuit 18, which produces log R'- log B'=log R'/B'. In the present embodiment, like the previous embodiment, the detection signal is zero because R'=B' if the white balance is attained, and the signal which monotonously varies with the color temperature as the average signal of R - B does is generated. Thus, it may be used as a color temperature change detection signal.

The detection signal is also zero when the signal G is not included and magenta ($G\approx 0$, $R\approx 1$, $B\approx 1$) is used. Accordingly, the chrominance signals shown in the quadrants I and III on the vectorscope of FIG. 3 are not sensed or the impact thereby is very small.

Figure 9:
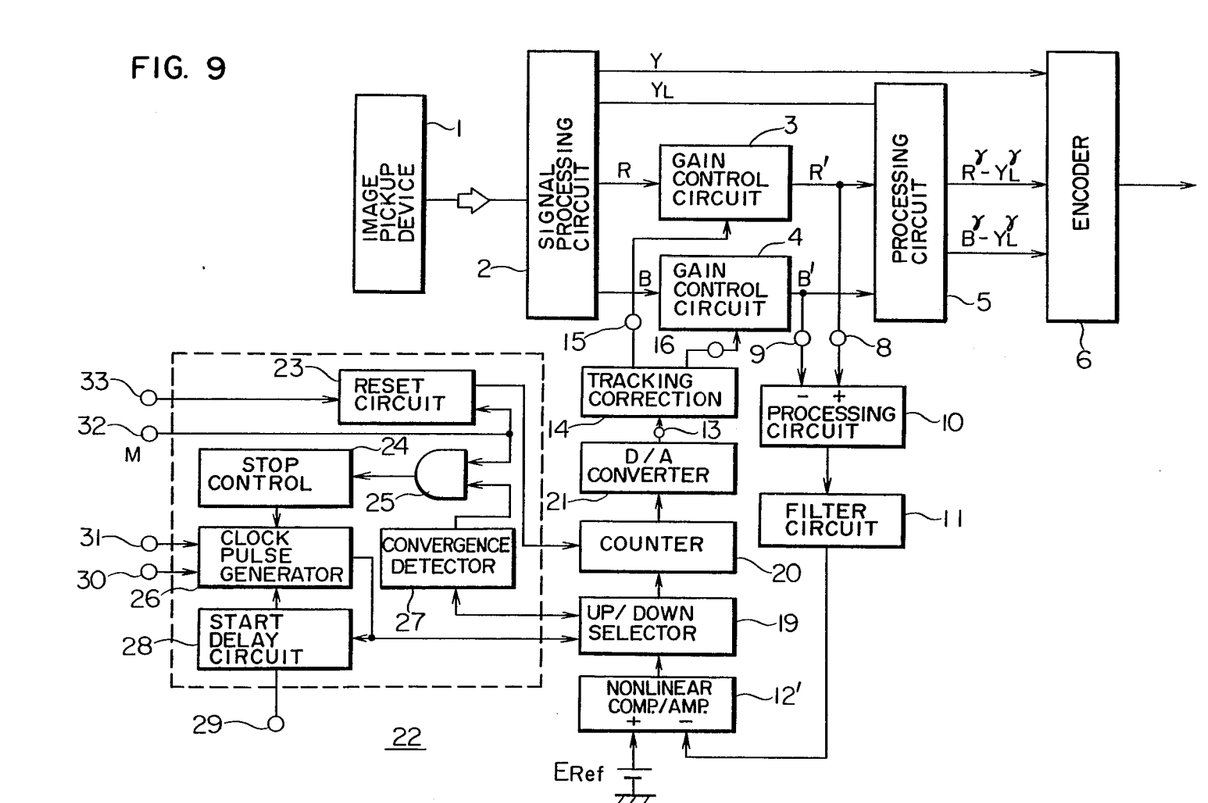
FIG. 9 shows a block diagram of another embodiment of the white balance adjusting device.

FIG. 9 shows another embodiment. The blocks designated using like numerals to those shown in FIG. 1 may be constructed using like circuits and operate and function in the like manner. Therefore, a detailed explanation thereof is omitted.

In the present embodiment, a comparator/ amplifier 12', an up/down selector 19, an up/down counter 20, a digital-analog (D/A) converter 21 and a start/stop control circuit 22 shown by broken lines are added between the filter circuit 11 and the tracking correction circuit 14 shown in the embodiment of FIG. 1. It uses a digital circuit in the circuit which produces the white balance control signal. A basic operation is explained below. The output of the filter circuit 11 which filters the differential chrominance to produce the control signal is supplied to the comparator/amplifier 12', which compares it with the reference voltage Eref and produces a high level "H" output or a low level "L" output depending on whether it is larger or smaller than the reference voltage Eref. In response to the "H" or "L" output, the up/down selector 19 supplies a control signal to the up/down counter 20 to cause the up/down counter 20 to count up or down clock pulses. The count in the up/down counter 20 is supplied to the D/A converter 21, which converts it to an analog control signal to control the white balance. This signal is supplied to the R and B signal gain control circuits 3 and 4 through the tracking correction circuit 14 as is done in the previous embodiment so that the white balance is automatically adjusted.

In the present embodiment, like the embodiment of FIG. 1, the automatic tracking auto-white balancing device is provided which attains the same effect as that of the embodiment of FIG. 1. By the digitization, a memory function is provided. Thus, the control loop can be stopped at any point to fix the white balance. Thus, a white object is photographed to determine a theoretical white balance, which may be held, or the automatic tracking auto-white balance operation may be temporarily stopped and the previous output may be held in order to prevent an error due to a noise when the object is of very low illuminance. The start/stop control circuit 22 is provided to control the selection of the operation mode and the white balance adjustment of the digital circuit. In the start/stop control circuit 22, the output from the up/down selector 19 is supplied to a convergence detector 27 which produces an "H" (high level) detection output when the number of times of reversal of the level of the input signal which is reversed for each clock pulse $\phi$ supplied from the clock pulse generator 26 reaches a predetermined number. This state occurs when the reference white balance voltage Eref which is the input level to the comparator-/amplifier 12' is substantially equal to the filtered signal R'-B'. The output of the convergence detection circuit 27 is supplied to an AND circuit 25. When the mode selection signal M supplied to an input terminal 32 is "H" and the detection signal is also "H", the output of the AND circuit 25 is "H". Thus, the stop control circuit 24 generates the stop control signal to stop the operation of the clock pulse generator 26. Since the stop control circuit 24 generates the signal to control the operation of the clock pulse generator 26 in accordance with the logical output of the AND circuit 25, it may be omitted depending on the setting of the clock pulse generator 26 and the output of the AND circuit 25 may be used to directly control the clock pulse generator 26. Usually, it may be an inverter for inverting the output of the AND circuit 25. When the mode select signal M is "L" (low level), the convergence detection signal is not supplied to the stop control circuit 24 and the clock pulse generator 26 continues to operate. Accordingly, the continuous operation (or automatic tracking) or the initial setting operation (semi-automatic tracking) can be selected by the mode select signal M. A reference pulse signal from an oscillator which produces the synchronization signal in the camera is supplied to an input terminal 30 of the clock pulse generator 26. If the clock pulse $\phi$ generated by the clock pulse generator 26 is set to the field frequency of the television signal, it may also be used as the vertical synchronization signal necessary for the camera. Thus, the construction of the clock pulse generator 26 can be simplified. The clock pulse generator further has an input terminal 31 to which a signal for controlling the generation of the clock pulse is connected. By the voltage applied to the input terminal 31, the clock pulse $\phi$ may be forcibly stopped and the previous state may be held so that the white balance is fixed. A reset circuit 23 prevents abnormal image at the power-on or mode selection. It resets the up/down counter 20 by the reset signal generated at such a state and supplied to an input terminal 33. A start delay circuit 28 delays the generation of the clock pulse for a predetermined period (less than one second) in response to a signal applied to an input terminal 29 from a switch actuated in connection with the insertion of a white plate which is inserted into an optical system (not shown) in order to adjust the white balance. When the white plate is inserted, an input light intensity abruptly changes and the automatic gain control of the circuit operates accordingly. The start delay circuit 28 is provided in order to delay the white balance adjustment until such control operation terminates. In the embodiment shown in FIG. 9, both the automatic white balance tracking system and the fixed white balance system can be used so that a more satisfactory white balance device is provided.

Figure 10:
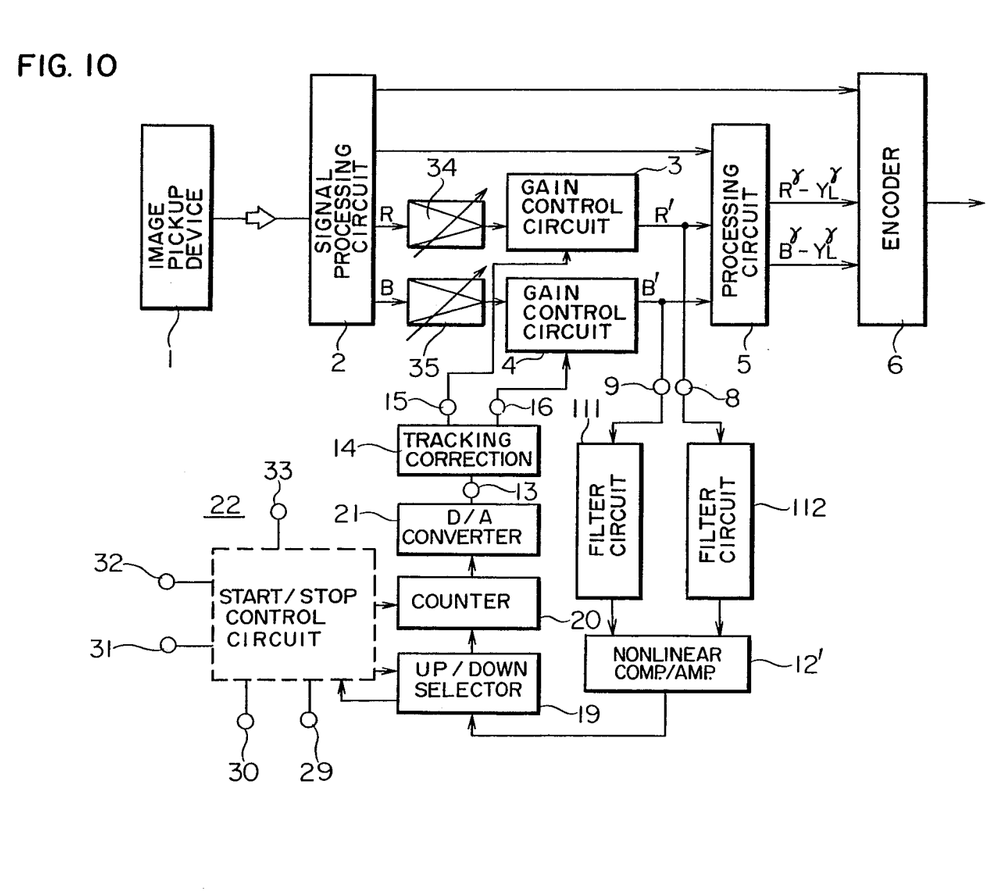
FIG. 10 shows a block diagram of a modification of the embodiment of FIG. 9.

An embodiment shown in FIG. 10 is similar to that of FIG. 9 except that the R' signal and B' signal are filtered by the filter circuits 111 and 112 and the outputs thereof are supplied to the comparator/amplifier 12'. The control is done such that the R' signal and the B' signal are essentially equal. When $R' \approx B'$, the white balance is attained. The white balance at the reference color temperature is set by separate gain control amplifiers 34 and 35.

We claim:

1. A white balance adjusting device for a color video camera for automatically white-balancing by controlling a chrominance signal processing circuit by a white balance control signal derived from chrominance signals supplied from an image pickup device, comprising:
    variable gain amplifiers to which at least red (R) and blue (B) signals of the chrominance signals generated by processing the output signals of said image pickup device are supplied and a gain of which is controlled by a control signal;
    detection means for detecting a change of a color temperature from at least two different chrominance signals and providing a corresponding output signal; and
    compare/amplify means for comparing the output signal of said detection means with a distinct reference voltage source to generate the control signal to be fed back to said variable gain amplifiers.

2. A white balance adjusting device for a color video camera according to claim 1 wherein said detection means includes means for processing the red (R) signal and blue (B) signal and filtering (averaging) the processed signals to generate a detection signal representative of color temperature change.

3. A white balance adjusting device for a color video camera according to claim 2 wherein said detection means includes logarithmic compression circuits to which the red (R) signal and blue (B) signal are supplied, respectively, a processing circuit for subtracting the outputs of said logarithmic compression circuits, and a filter circuit for filtering the output of said processing circuit.

4. A white balance adjusting device for a color video camera according to claim 2, wherein said compare/amplify means for providing said feedback control signal includes a comparator/amplifier having two inputs, one of which is for applying said reference voltage source and the other is to apply thereto the detection signal representative of color temperature change generated at the output of said detection means wherein said comparator/amplifier has a non-linear amplification characteristic with respect to an input compare level, and has an amplification factor to effect in a negative feedback loop gain of less than 20 db.

5. A white balance adjusting device for a color video camera according to claim 2, wherein said variable gain amplifiers include two variable gain amplifiers and wherein there is further included a tracking correction circuit for converting the feedback control signal from said compare/amplifying means to two central signals to be supplied to said two variable gain amplifiers and wherein said two control signals change on different loci of change in accordance with a change of color temperature.

6. A white balance adjusting device for a color video camera according to claim 2, further including level compare means for comparing the output of said detection means with the reference voltage source to generate a high level or low level feedback control signal depending on the comparison result, count means for counting up or down clock pulses in accordance with the level of the control signal outputted by said level compare means, digital/analog conversion means for converting the count of said count means to an analog signal, control means for controlling the supply of the clock pulses to said count means, and means for feeding the output of said digital/analog conversion means to said variable gain amplifiers.

7. A white balance adjusting device for a color video camera according to claim 1 wherein said detection means includes means for filtering (averaging) the red (R) and blue (B) signals and processing the filtered signals to generate a detection signal representative of color temperature change.

8. A white balance adjusting device for a color video camera according to claim 7, wherein said detection means further includes respective logarithmic compression circuits for logarithmically compressing the filtered R signal and B signal and then processing the filtered signals to generate a detection signal representative of color temperature change.

9. A white balance adjusting device for a color video camera according to claim 7, wherein said compare/amplify means for providing said feedback control signal includes a comparator/amplifier having two inputs, one of which is for applying said reference voltage source and the other is to apply thereto the detection signal representative of color temperature change generated at the output of said detection means, wherein said comparator/amplifier has a non-linear amplification characteristic with respect to an input compare level, and has an amplification factor to effect in a negative feedback loop gain of less than 20 db.

10. A white balance adjusting device for a color video camera according to claim 7, further including level compare means for comparing the output of said detection means with the reference voltage source to generate a high level or low level feedback control signal depending on the comparison result, count means for counting up or down clock pulses in accordance with the level of the control signal outputted by said level compare means, digital/analog conversion means for converting the count of said count means to an analog signal, control means for controlling the supply of the clock pulses to said count means, and means for feeding the output of said digital/analog conversion means to said variable gain amplifiers.

11. A white balance adjusting device for a color video camera according to claim 10, further comprising amplifiers for setting the white balance under illumination by the reference color temperature and being interposed on the input side of said variable gain amplifiers and on respective R signal and B signal paths.

12. A white balance adjusting device for a color video camera according to claim 1 wherein said detection means includes means for processing two different differential chrominance signals and filtering (averaging) the processed signals to generate a detection signal representative of color temperature.

13. A white balance adjusting device for a color video camera according to claim 12, wherein said compare/amplify means for providing said feedback control signal includes a comparator/amplifier having two inputs, one of which is for applying said reference voltage source and the other is to apply thereto the detection signal representative of color temperature change generated at the output of said detection means, wherein said comparator/amplifier has a non-linear amplification characteristic with respect to an input compare level, and has an amplification factor to effect in a negative feedback loop gain of less than 20 db.

14. A white balance adjusting device for a color video camera according to claim 12, wherein said variable gain amplifiers include two variable gain amplifiers and wherein there is further included a tracking correction circuit for converting the feedback control signal from said compare/amplifying means to two central signals to be supplied to said two variable gain amplifiers and wherein said two control signals change on different loci of change in accordance with a change of color temperature.

15. A white balance adjusting device for a color video camera according to claim 1 wherein said detection means includes means for filtering (averaging) two different differential chrominance signals and processing the filtered signals to generate a detection signal representative of color temperature.

16. A white balance adjusting device for a color video camera according to claim 1 wherein said detection means includes logarithmic compression circuits to which the red (R) signal and blue (B) signal are applied, respectively, a processing circuit for subtracting the outputs of said logarithmic compression circuits, and a filter circuit for filtering the output of said processing circuit.

17. A white balance adjusting device for a color video camera according to claim 1 wherein said detection means includes filter circuits for filtering the red (R) signal and blue (B) signal, logarithmic compression circuit for logarithmically compressing the filtered signals, and a processing circuit for subtracting the outputs of said logarithmic compression circuits to generate a detection signal representative of color temperature change.

18. A white balance adjusting device for a color video camera according to claim 1 wherein said compare/amplify means for providing said feedback control signal includes a comparator/amplifier having two inputs, one of which is for applying said reference voltage source and the other is to apply thereto the detection signal representative of color temperature change generated at the output of said detection means, wherein said comparator/amplifier has a non-linear amplification characteristic with respect to an input compare level, and has an amplification factor to effect in a negative feedback loop gain of less than 20 db.

19. A white balance adjusting device for a color video camera according to claim 1, wherein said variable gain amplifiers include two variable gain amplifiers and wherein there is further included a tracking correction circuit for converting the feedback control signal from said compare/amplifying means to two central signals to be supplied to said two variable gain amplifiers and wherein said two control signals change on different loci of change in accordance with a change of color temperature.

20. A white balance adjusting device for a color video camera according to claim 1, further including level compare means for comparing the output of said detection means with the reference voltage source to generate a high level or low level feedback control signal depending on the comparison result, count means for counting up or down clock pulses in accordance with the level of the control signal outputted by said level compare means, digital/analog conversion means for converting the count of said count means to an analog signal, control means for controlling the supply of the clock pulses to said count means, and means for feeding the output of said digital/analog conversion means to said variable gain amplifiers.

* * * * *